(12) United States Patent
Shimomaki

(10) Patent No.: US 8,358,385 B2
(45) Date of Patent: Jan. 22, 2013

(54) LIQUID CRYSTAL DISPLAY APPARATUS WHICH PERFORMS DISPLAY BY USING ELECTRIC FIELD IN DIRECTION SUBSTANTIALLY PARALLEL WITH SUBSTRATE SURFACES TO CONTROL ALIGNMENT DIRECTION OF LIQUID CRYSTAL MOLECULES

(75) Inventor: Shinichi Shimomaki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 74 days.

(21) Appl. No.: 12/564,489

(22) Filed: Sep. 22, 2009

(65) Prior Publication Data

US 2010/0007835 A1    Jan. 14, 2010

Related U.S. Application Data

(62) Division of application No. 11/412,037, filed on Apr. 26, 2006, now Pat. No. 7,619,698.

(30) Foreign Application Priority Data

Jan. 31, 2006   (JP) ................................ 2006-022438

(51) Int. Cl.
    *G02F 1/136*   (2006.01)
(52) U.S. Cl. ........................................................ 349/43
(58) Field of Classification Search ................... 349/43
    See application file for complete search history.

(56) References Cited

U.S. PATENT DOCUMENTS

| | | | |
|---|---|---|---|
| 6,449,026 B1 | 9/2002 | Min et al. | |
| 6,721,028 B2 | 4/2004 | Kim et al. | |
| 6,816,222 B2 | 11/2004 | Ono et al. | |
| 6,862,067 B2 | 3/2005 | Matsumoto et al. | |
| 7,164,402 B2 | 1/2007 | Yanagawa et al. | |
| 7,551,169 B2 | 6/2009 | Yanagawa et al. | |
| 2003/0184469 A1 | 10/2003 | Brosche | |
| 2003/0184699 A1 | 10/2003 | Matsumoto et al. | |

(Continued)

FOREIGN PATENT DOCUMENTS

| | | |
|---|---|---|
| CN | 1448762 A | 10/2003 |
| CN | 1459657 A | 12/2003 |

(Continued)

OTHER PUBLICATIONS

Taiwanese Office Action dated Feb. 12, 2010 and English translation thereof in counterpart Taiwanese Application No. 095115007.

(Continued)

*Primary Examiner* — Mark Robinson
*Assistant Examiner* — Erin Chiem
(74) *Attorney, Agent, or Firm* — Holtz, Holtz, Goodman & Chick, PC

(57) ABSTRACT

A liquid crystal display apparatus includes a liquid crystal layer which is disposed in a gap between first and second substrates with long axes of liquid crystal molecules being aligned in one direction, in substantially parallel to substrate surfaces. A plurality of thin film transistors are arranged in row and column directions on an upper side of the first substrate. Pixel electrodes are provided on the upper side of the first substrate to be electrically connected with the thin film transistors. A common electrode is formed on the upper side of the first substrate between the substrate and the liquid crystal layer to correspond to the pixel electrode through an insulating film, and generates an electric filed which controls an alignment direction of the liquid crystal molecules in a plane substantially parallel with the substrate surfaces between itself and the pixel electrode.

7 Claims, 11 Drawing Sheets

U.S. PATENT DOCUMENTS

| | | |
|---|---|---|
| 2003/0202140 A1 | 10/2003 | Liu |
| 2004/0027525 A1 | 2/2004 | Itakura et al. |
| 2004/0223096 A1 | 11/2004 | Ochiai et al. |
| 2005/0088600 A1 | 4/2005 | Mizoguchi |

FOREIGN PATENT DOCUMENTS

| | | | |
|---|---|---|---|
| CN | 1609690 A | | 4/2005 |
| JP | 5-127195 A | | 5/1993 |
| JP | 2000292802 A | * | 10/2000 |
| JP | 2001-174818 A | | 6/2001 |
| JP | 2002-82357 A | | 3/2002 |
| JP | 2002-169179 A | | 6/2002 |
| JP | 2002-296615 A | | 10/2002 |
| JP | 2003-233083 A | | 8/2003 |
| KR | 2001-3748 A | | 1/2001 |
| KR | 2002-41426 A | | 6/2002 |
| KR | 2002-63498 A | | 8/2002 |
| KR | 1020020085237 A | | 11/2002 |
| TW | 594185 B | | 6/2004 |
| TW | 594335 B | | 6/2004 |

OTHER PUBLICATIONS

Japanese Office Action dated Nov. 24, 2010 (and English translation thereof) in counterpart Japanese Application No. 2006-094929.

Korean Office Action dated Jan. 26, 2010 and English translation thereof issued in a counterpart Korean Application No. 10-2008-7004012.

Notification Concerning Transmittal of International Search Report and Written Opinion of the International Searching Authority for PCT/JP2006/309131, 12 sheets.

Korean Office Action dated Apr. 27, 2009 (6 pages), and English translation thereof (9 pages), issued in counterpart Korean Application Serial No. 10-2008-7004012.

Chinese Office Action dated May 8, 2009 (8 pages), and English translation thereof (9 pages), issued in counterpart Chinese Application Serial No. 2006800307511.

* cited by examiner

LIQUID CRYSTAL DISPLAY APPARATUS WHICH PERFORMS DISPLAY BY USING ELECTRIC FIELD IN DIRECTION SUBSTANTIALLY PARALLEL WITH SUBSTRATE SURFACES TO CONTROL ALIGNMENT DIRECTION OF LIQUID CRYSTAL MOLECULES

CROSS-REFERENCE TO RELATED APPLICATIONS

The present application is a Divisional Application of U.S. application Ser. No. 11/412,037 filed Apr. 26, 2006 now U.S. Pat. No. 7,619,698, which is based upon and claims the benefit of priority from prior Japanese Patent Application No. 2006-022438, filed Jan. 31, 2006, the entire contents of which are incorporated herein by reference.

BACKGROUND OF THE INVENTION

1. Field of the Invention

The present invention relates to a liquid crystal display apparatus which performs display by using an electric field parallel with substrate surfaces to control a direction of liquid crystal molecules in a plane parallel with the substrate surfaces.

2. Description of the Related Art

As a liquid crystal display apparatus, there is known one having a configuration in which a liquid crystal layer having liquid crystal molecules aligned in substantially parallel with substrate surfaces with long axes being aligned in one direction is provided between a pair of substrates facing each other with a gap therebetween. Pixel electrodes and a common electrode which are insulated from each other are provided on an inner surfaces of one of the substrates facing each other in order to generate an electric field which controls an alignment direction of the liquid crystal molecules in a plane substantially parallel with the substrate surfaces.

Conventionally, this liquid crystal display apparatus is configured to include on an inner surface of one of the substrates, a common electrode corresponding to each pixel region, and a plurality of pixel electrodes provided on an insulating layer covering the common electrode in accordance with the common electrode. A plurality of thin film transistors respectively are connected with these pixel electrodes also, there are provided a plurality of scanning lines which supply gate signals to the thin film transistors in respective rows, and a plurality of signal liens which supply data signals to the thin film transistors in respective columns, such an apparatus is described in, for example, Jpn. Pat. Appln. KOKAI Publication No. 2002-82357.

In the conventional liquid crystal display apparatus, alignment of liquid crystal molecules in a peripheral region of each pixel is disordered, light leaks in a peripheral portion of the pixel and thus contrast is lowered, due to an influence of an electric field generated between the scanning lines or the signal lines and the pixel electrodes. Further, when a black mask is provided in order to avoid this light leak, there occurs a problem that an aperture ratio is reduced and a display image is darkened.

BRIEF SUMMARY OF THE INVENTION

It is an object of the present invention to provide a liquid crystal display apparatus which can eliminate light leak in a peripheral portion of each pixel and increase contrast and an aperture ratio to display a bright image.

According to a first aspect of the present invention, there is provided a liquid crystal display apparatus a liquid crystal display apparatus comprising:

a pair of substrates arranged to face each other with a gap therebetween;

a liquid crystal layer which is disposed in the gap between the pair of substrates with long axes of liquid crystal molecules being aligned in one direction, in substantially parallel to substrate surfaces;

a plurality of thin film transistors which are arranged in a row direction and a column direction on an inner surface side of one of the pair of substrates that faces the other substrate, and to which display signals corresponding to display data are supplied;

a plurality of pixel electrodes which are provided on the inner surface side of the one substrate to be electrically connected with the thin film transistors, and to which the display signals are supplied from the thin film transistors; and a common electrode which is formed on the inner surface side of the one substrate between the one substrate and the liquid crystal layer to correspond to the pixel electrode through an insulating film, and generates an electric filed which controls an alignment direction of the liquid crystal molecules in a plane substantially parallel with the substrate surfaces between itself and the pixel electrode.

In this liquid crystal display apparatus, it is desirable that at least a part of the common electrode is superimposed on the pixel electrode and at least one edge portion which defines each pixel is formed in accordance with each region corresponding to the pixel electrode. Furthermore, it is desirable that an edge portion which defines each pixel in accordance with each region corresponding to the pixel electrode and a plurality of edge portions arranged on an inner side of the pixel region are formed between the common electrode and the pixel electrode in order to generate an electric field in a direction substantially parallel with the substrate inner surfaces.

In this liquid crystal display apparatus, it is desirable to further provide on an inner surface side of one of the substrates: a plurality of scanning lines which are respectively arranged along a row direction between rows of the respective pixel electrodes and supply scanning signals to the thin film transistors in the respective rows; and a plurality of signal lines which are respectively arranged along a column direction between columns of the respective pixel electrodes and supply display signals to the thin film transistors in the respective columns.

Moreover, it is desirable that the common electrode is formed into a continuous shape extending in at least one of the pixel electrode row direction and the pixel electrode column direction on an insulating layer covering the plurality of pixel electrodes, thin film transistors, scanning lines and signal lines by a region covering at least one of a region between the pixel electrodes adjacent to each other with the scanning line therebetween and a region between the pixel electrodes adjacent to each other with the signal line therebetween, a plurality of partial electrodes which are aligned in parallel with each other at intervals are formed at a part of the common electrode corresponding to the pixel electrodes, and an electric field which controls an alignment direction of the liquid crystal molecules is generated between an edge portion of each partial electrode and the pixel electrode.

Additionally, in this liquid crystal display apparatus, it is desirable that the insulating film which is interposed between the pixel electrodes and the common electrode of one of the substrates is a flattened film which is formed to cover the pixel electrodes, the thin film transistors and wiring lines connected with the transistors and determines an inner surface of one of the substrates as a flat surface.

In this liquid crystal display apparatus, it is preferable to further provide on the inner surface of one of the substrates: a plurality of scanning lines which are respectively arranged along a row direction between rows of the respective pixel electrodes and supply scanning signals to the thin film transistors in the respective rows; and a plurality of signal lines which are respectively arranged along a column direction between columns of the respective pixel electrodes and supply display signals to the thin film transistors in the respective columns.

Further, it is preferable that the common electrode is formed on an insulating layer covering the plurality of pixel electrodes, thin film transistors, scanning lines and signal lines to cover both a region between the pixel electrodes adjacent to each other with the scanning line therebetween and a region between the pixel electrodes adjacent to each other with the signal line therebetween, a plurality of edge portions which are aligned in parallel with each other at intervals are formed in a region of the common electrode corresponding to the pixel electrode, and an electric field which controls an alignment direction of the liquid crystal molecules is generated between the edge portions and the pixel electrode.

In this case, it is preferable that, on an insulating film of one substrate, the common electrode is constituted of a transparent electroconductive film in which a plurality of edge portions aligned in parallel with each other at intervals in a region corresponding to each pixel are formed, and a metal electroconductive film formed along one of a scanning line extending along a row direction between the pixels adjacent to each other and a signal line extending in a column direction between the same. Furthermore, it is preferable that, on the insulating film of the one substrate, the common electrode is constituted of a transparent electroconductive film in which a plurality of edge portions aligned in parallel with each other at intervals in a region corresponding to each pixel are formed; and a metal electroconductive film which is formed along at least a scanning line of the scanning line extending in a row direction between the pixels adjacent to each other and a signal line extending in a column direction between the same to cover the scanning line and the thin film transistor. Moreover, it is preferable that, on the insulating film of the one substrate, the common electrode is constituted of a transparent electroconductive film in which a plurality of edge portions which are aligned in parallel with each other at intervals in a region corresponding to each pixel are formed, and a metal electroconductive film which is formed along at least a scanning line of the scanning line extending in a row direction between the pixels adjacent to each other and a signal line extending in a column direction between the same at a part excluding a region corresponding to the thin film transistor to cover the scanning line. Additionally, in this case, it is desirable to further include a light shielding film which is formed on an inner surface of the other one of the pair of substrates in a region corresponding to each thin film transistor formed on the one substrate. Further, it is preferable that, on the insulating film of the one substrate, the common electrode is constituted of a transparent electroconductive film in which a plurality of edge portions aligned in parallel with each other at intervals in a region corresponding to each pixel are formed, and a metal electroconductive film formed along both a scanning line extending in a row direction between the pixels adjacent to each other and a signal line extending in a column direction between the same.

In this liquid crystal display apparatus, it is preferable that the common electrode is formed on a substantially entire surface of the insulating film covering the plurality of pixel electrodes, thin film transistors, scanning lines and signal lines, and slits which generate an electric field which controls an alignment direction of the liquid crystal molecules between the common electrode and the pixel electrodes and form a plurality of edge portions aligned in parallel with each other at intervals are provided in a region of the common electrode corresponding to each pixel electrode. In this case, it is preferable that the slits formed in the common electrode are formed toward a direction obliquely crossing a direction of an aligning treatment of an aligning film to form edge portions which cross in an oblique state except perpendicular and parallel states a direction of long axes of the liquid crystal molecules aligned by the aligning film formed on one substrate surface. Furthermore, it is preferable for the pixel electrode formed on the one substrate to be constituted of a transparent electroconductive film which has a shape corresponding to the slits formed in the common electrode in a region corresponding to the pixel and has opening portions formed in a region overlapping the slits of the common electrode. Moreover, it is desirable for the pixel electrode formed on the one substrate to be constituted of a transparent electroconductive film which has a shape corresponding to the slits formed in the common electrode in a region corresponding to the pixel and has an opening portions formed in a region overlapping the slits of the common electrode.

In this liquid crystal display apparatus, it is preferable for the pixel electrode formed on the one substrate to be constituted of one substantially rectangular transparent electroconductive film having an area corresponding to the pixel.

According to a second aspect of the present invention, there is provided a liquid crystal display apparatus a liquid crystal display apparatus comprising:

first and second substrates arranged to face each other with a gap therebetween;

a liquid crystal layer which is disposed in the gap between the pair of substrates with long axes of liquid crystal molecules being aligned in one direction, in substantially parallel with substrate surfaces;

a plurality of thin film transistors which are arranged in a row direction and a column direction on an inner surface side of the first substrates that faces the second substrate, and to which display signals corresponding to display data are supplied;

a plurality of pixel electrodes which are provided on the inner surface side of the first substrate to be electrically connected with the thin film transistors, and to which the display signals are supplied from the thin film transistors;

a plurality of signal lines which are respectively arranged between respective pixel electrode rows along the row direction on the inner surface side of the first substrate and which supply scanning signals to the thin film transistors in the respective rows;

a plurality of signal lines which are respectively arranged between respective pixel electrode columns along the column direction on the inner surface side of the first substrate and which supply display signals to the thin film transistors in the respective columns; and a common electrode which is formed on an insulating film on the inner surface side of the first substrate to correspond to the pixel electrodes between the pixel electrodes and the liquid crystal layer, and the common electrode being constituted of a transparent electroconductive film in which a plurality of edge portions aligned in parallel with each other at intervals in a region corresponding to each pixel are formed, and of a metal electroconductive film which is formed along at least the scanning line of the scanning line extending in the row direction between the pixels adjacent to each other and the scanning line extending in the column direction between the same to cover the scanning line and the thin film transistor, wherein the common electrode generates an electric field which controls an alignment direction of the liquid crystal molecules in a plane substantially parallel with the substrate surfaces between itself and the pixel electrode.

In this liquid crystal display apparatus, it is preferable that the common electrode is formed on a substantially entire surface of an insulating layer covering the plurality of pixel electrodes, thin film transistors, scanning lines and signal lines, slits forming a plurality of edge portions aligned in parallel with each other at intervals to generate an electric filed which controls an alignment direction of the liquid crystal molecules between the common electrode and the pixel electrode are provided in a region of the common electrode corresponding to the pixel electrode, and the common electrode is bent in a V-like shape to form an edge portion which crosses in an oblique state except perpendicular and parallel states a direction of an aligning treatment of an aligning film formed on one substrate surface. Moreover, it is preferable for the pixel electrode formed on the one substrate to be constituted of one substantially rectangular transparent electroconductive film having an area corresponding to the pixel.

According to a third aspect of the present invention, there is provided a liquid crystal display apparatus a liquid crystal display apparatus comprising:

a pair of substrates arranged to face each other with a predetermined gap therebetween;

a liquid crystal layer which is disposed in the gap between the pair of substrates with long axes of liquid crystal molecules being aligned in a predetermined direction, in substantially parallel with substrate surfaces;

a plurality of thin film transistors which are arranged in a row direction and a column direction on an inner surface side of one of the pair of substrates that faces the other substrate, and to which display signals corresponding to display data are supplied;

a plurality of pixel electrodes which are provided on the inner surface side of the one substrate to be electrically connected with the tin film transistors, and to which the display signals are supplied from the thin film transistors;

a plurality of scanning lines which are respectively arranged between respective pixel electrode rows along the row direction on the inner surface side of the one substrate and which supply scanning signals to the thin film transistors in the respective rows;

a plurality of signal lines which are respectively arranged between respective pixel electrode columns along the column direction on the inner surface side of the one substrate and which supply display signals to the thin film transistors in the respective columns;

a common electrode which is constituted of a transparent electroconductive film which is formed to correspond to the pixel electrode on the liquid crystal display side apart from the pixel electrode through an insulating film and in which a plurality of edge portions aligned in parallel with each other at intervals in a region corresponding to each pixel are formed, and a metal electroconductive film which is formed along both the scanning line extending in the row direction between pixels adjacent to each other and the signal line extending in the column direction between the same at a part excluding a region corresponding to the thin film transistor to cover the scanning line and the signal line on the inner surface side of the one substrate, the common electrode generating an electric field which controls an alignment direction of the liquid crystal molecules in a plane substantially parallel with the substrate surfaces between itself and the pixel electrode; and a light shielding film which is formed in a region corresponding to the thin film transistor formed on one substrate on an inner surface side of the other one of the pair of substrates.

In the liquid crystal display apparatus according to the first aspect of the present invention, the common electrode is superimposed to cover the pixel electrode through the insulating film on the liquid crystal layer side apart from the pixel electrode, at least one edge portion is formed in accordance with each region corresponding to the pixel electrode, and an electric field which controls an alignment direction of the liquid crystal molecules in a plane substantially parallel with the substrate surface is generated between the pixel electrode and the edge portion. Therefore, an electric field which is generated in a peripheral portion of the pixel electrode excluding a part between the pixel electrode and the common electrode is blocked off with respect to the liquid crystal layer, and hence disorder of alignment of the pixel peripheral portion can be eliminated, thereby avoiding light leak.

In this liquid crystal display apparatus, it is desirable to form in the common electrode a plurality of slits which form edges facing the pixel electrode in accordance with the regions corresponding to the plurality of pixel electrodes. Adopting such a structure can generate an electric field having a substantially uniform intensity between each edge portion of the common electrode and the pixel electrodes, thereby displaying a high-quality image.

Additionally, in this liquid crystal display apparatus, a plurality of scanning lines which are respectively formed along each pixel electrode row and supply gate signals to the thin film transistors in the respective rows and a plurality of signal Lines which are respectively formed along each pixel electrode column and supply data signals to the thin film transistors in the respective columns are provided on the inner surface of one electrode, the common electrode is formed on an insulating layer covering the plurality of pixel electrodes, thin film transistors, scanning lines and signal lines into a shape extending in at least one of the pixel electrode row direction and the pixel electrode column direction by a region covering at least one of a region between the pixel electrodes adjacent to each other with the scanning line therebetween and a region between the pixel electrodes adjacent to each other with the signal line therebetween, a part of the common electrode corresponding to the pixel electrode is constituted of a plurality of partial electrodes aligned in parallel with each other at intervals, and an electric field which controls an alignment direction of the liquid crystal molecules is generated between an edge portion of each partial electrode and the pixel electrode. Therefore, an electric field generated between at least one of the scanning line and the signal line and the edge portion of the pixel electrode can be blocked off by the common electrode, and disorder of alignment of the liquid crystal molecules in a region around each pixel due to the electric field can be eliminated. Therefore, light leak in the pixel peripheral portion can be eliminated, thereby display a high-quality image having high contrast and a high numerical aperture.

In this liquid crystal display apparatus, the common electrode is formed to correspond to both a region between the pixel electrodes adjacent to each other with the plurality of scanning lines therebetween and a region between the pixel electrodes adjacent to each other with the signal line therebetween, and it is formed of the electroconductive film in which a plurality of slits forming a plurality of partial electrodes aligned in parallel at intervals in each part corresponding to each of the plurality of pixel electrodes. Therefore, light leak can be eliminated on an entire circumference of the pixel peripheral portion, the plurality of partial electrodes of the common electrode corresponding to the pixel electrode and portions of the common electrode corresponding to the regions between the pixel electrodes adjacent to each other can have substantially equal potentials, and an electric field having a substantially uniform intensity can be generated between the respective edge portions of the common electrode and the pixel electrodes, thereby displaying a high-quality image.

Further, it is desirable to form the plurality of pixel electrodes into a shape corresponding to a predetermined entire pixel region. Adopting such a configuration can substantially homogenize potentials of the pixel electrodes as a whole and generate an electric field having a substantially uniform intensity between the edge portions of the common electrode and the pixel electrodes, thereby displaying a higher-quality image.

Furthermore, in this liquid crystal display apparatus, a common electrode line formed of a metal electroconductive film having a low resistance is provided at a part of the common electrode corresponding to a region between the pixel electrodes along an entire length of this region along the scanning lines and the signal lines. As a result, the common electrode of the plurality of pixels arranged in the row direction and the column direction can have a substantially equal potential, thereby displaying an image having no luminance irregularities.

In the liquid crystal display apparatus according to the second aspect of the present invention, the common electrode is constituted of: the transparent electroconductive film which is formed to correspond to the pixel electrode through the insulating film on the liquid crystal layer side apart from the pixel electrodes and on which a plurality of edge portions aligned in parallel with each other at intervals in a region corresponding to each pixel are formed; and the metal electroconductive film which is formed along at least the scanning line of the scanning line extending in the row direction between the pixels adjacent to each other and the signal line extending in the column direction between the same to cover the scanning line and the thin film transistor. Furthermore, an electric field which controls an alignment direction of the liquid crystal molecules in a plane substantially parallel with the substrate surface is generated between the control electrode and the pixel electrode. Therefore, an electric field generated in a peripheral portion of the pixel electrode other than a part between the pixel electrode and the common electrode is blocked off with respect to the liquid crystal layer. As a result, light leak can be avoided without disorder of alignment in the pixel peripheral portion, thereby effecting bright display having high contrast and a high numerical aperture. Moreover, since the metal electroconductive film is formed on the common electrode along both the scanning line and the signal line, an electrical resistance of the common electrode can be decreased, and the uniform electrode can be applied to each pixel. Additionally, since the metal electroconductive film is formed to correspond to each thin film transistor, light shielding of this thin film transistor can be performed, thereby carrying out stable display.

In this liquid crystal display, when the V-shaped slits are provided in the common electrode, behaviors of the liquid crystal molecules due to application of an electric field can be stabilized. Further, when the pixel electrode is formed of one rectangular transparent electroconductive film, manufacture can be facilitated, thereby homogenizing an electric field of each pixel.

In the liquid crystal display apparatus according to the third aspect of the present invention, the common electrode is constituted of: the transparent electroconductive film which is formed to correspond to the pixel electrode through the insulating film on the liquid crystal layer side apart from the pixel electrode and in which the plurality of edge portions aligned in parallel with each other at intervals in a region corresponding to each pixel are formed; and the metal electroconductive film which is formed along both the scanning line extending in the row direction between the pixels adjacent to each other and the signal line extending in the column direction between the same to cover the scanning line and the signal line in a part excluding the region corresponding to the thin film transistor. Furthermore, an electric field which controls an alignment direction of the liquid crystal molecules in a plane substantially parallel with the substrate surface is generated between the common electrode and the pixel electrode. Therefore, an electric field which is generated in a peripheral part of the pixel electrode other than a part between the pixel electrode and the common electrode is blocked off with respect to the liquid crystal layer. As a result, light leak can be avoided without disorder of alignment in the pixel peripheral portion, thereby effecting bright display having high contrast and a high numerical apertures. Moreover, since the metal electroconductive film is formed on the common electrode along both the scanning line and the signal line, an electrical resistance of the common electrode can be reduced, and a uniform electrode can be applied to each pixel. Additionally, the metal electroconductive film is formed on the part excluding the region corresponding to the thin film transistor, and the light shielding film is formed on the inner surface of the other substrate in the region corresponding to the thin film transistor. Therefore, a stray capacity generated between this thin film transistor and the common electrode can be reduced so that a load applied to a driver of this liquid crystal display apparatus can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
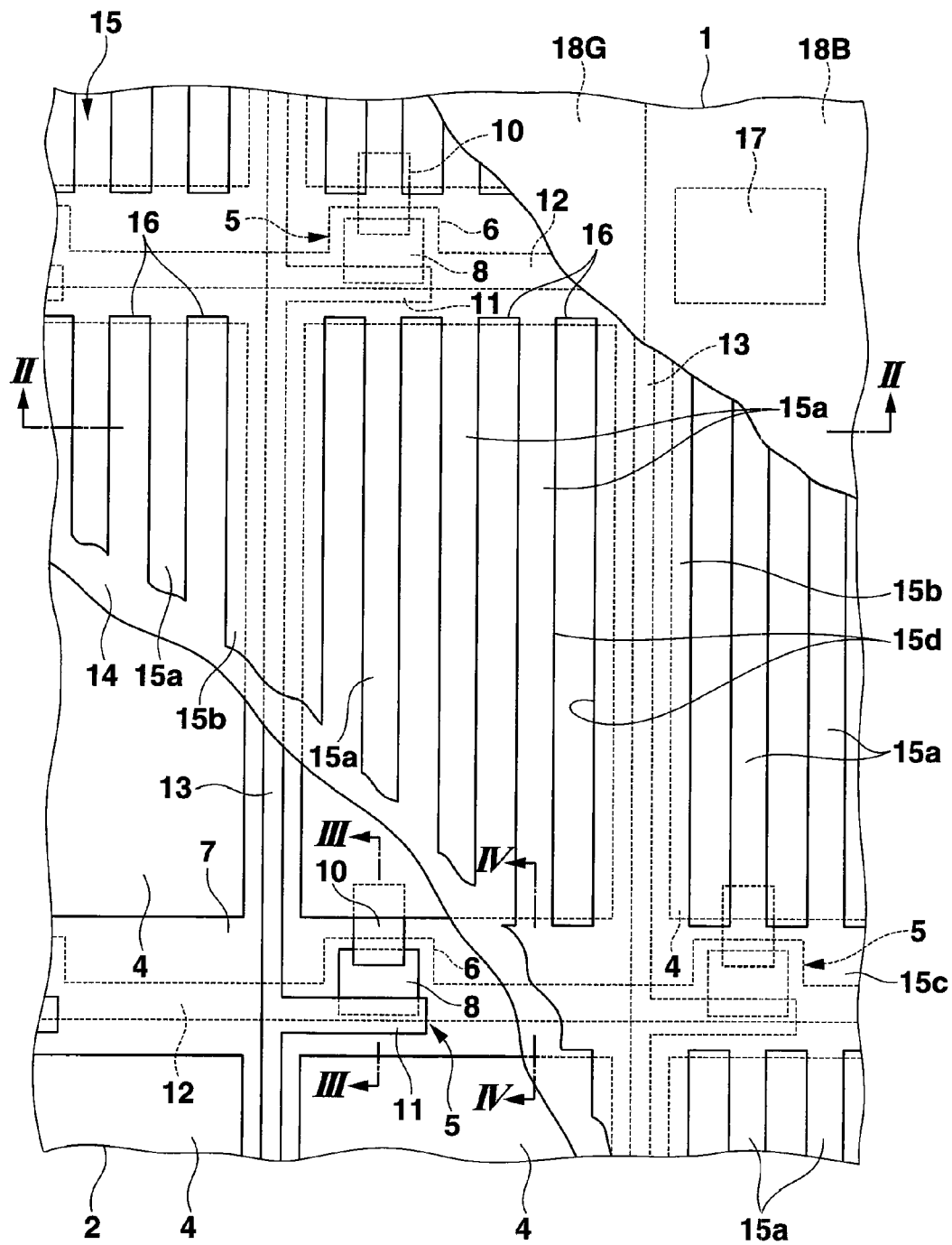
FIG. 1 is a plan view showing a part of a liquid crystal display apparatus according to a first embodiment of the present invention.
Figure 2:
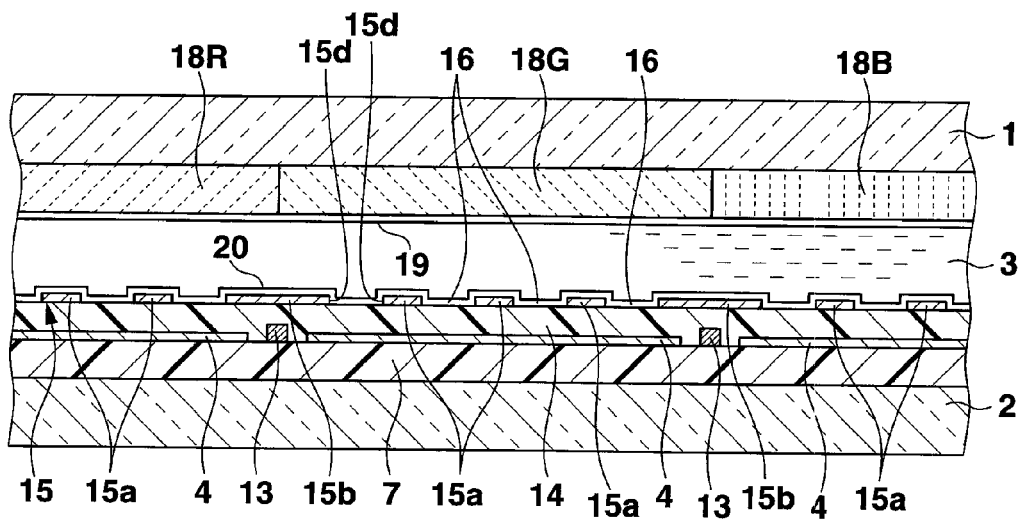
FIG. 2 is a cross-sectional view taken along a line II-II in FIG. 1.
Figure 3:
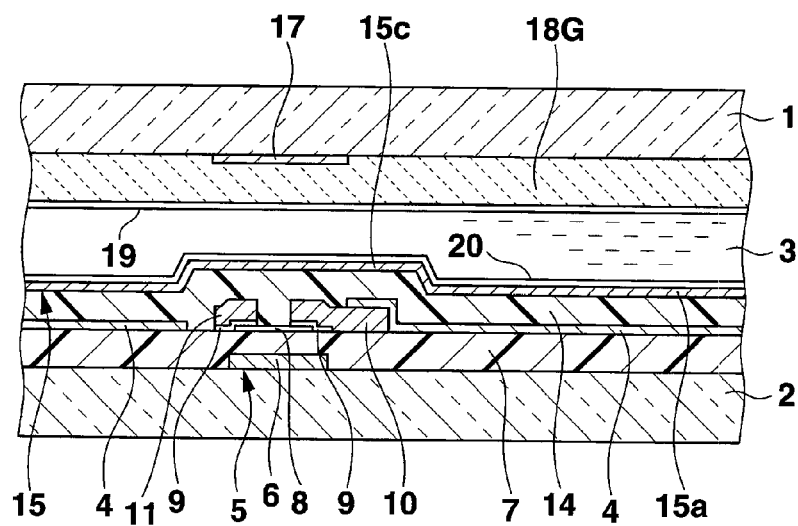
FIG. 3 is a cross-sectional view taken along a line III-III in FIG. 1.
Figure 4:
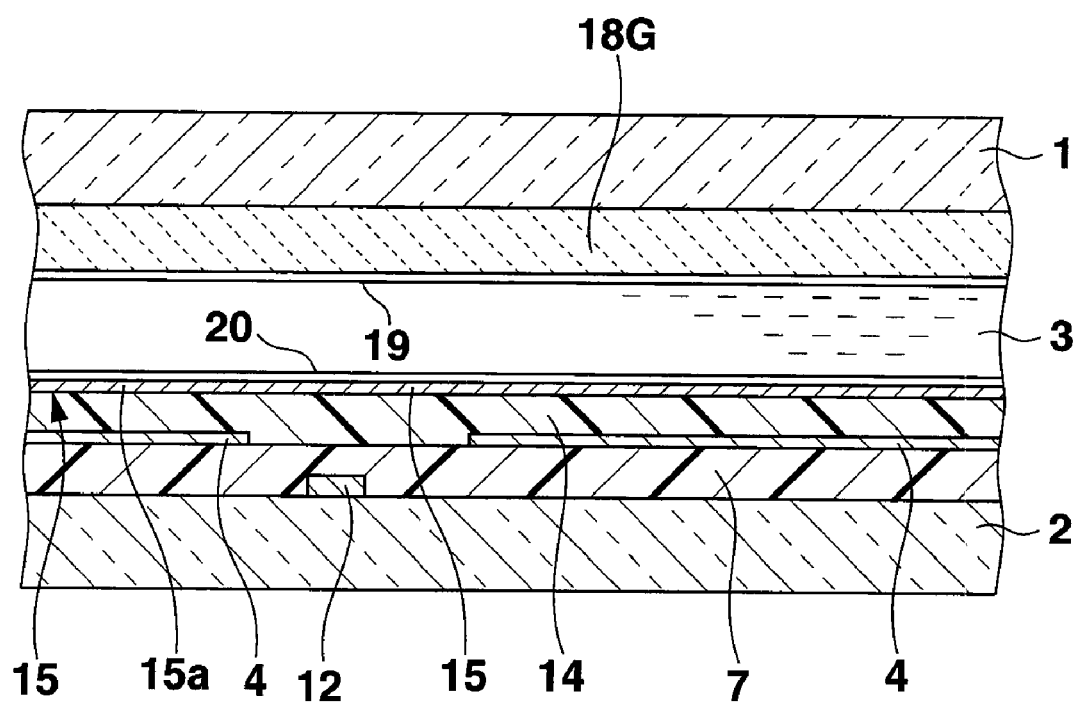
FIG. 4 is a cross-sectional view taken along a line IV-IV in FIG. 1.

FIGS. 1 to 4 show a first embodiment of the present invention, in which FIG. 1 is a plan view showing a part of a liquid crystal display apparatus, FIG. 2 is a cross-sectional view taken along a line II-II in FIG. 1, FIG. 3 is a cross-sectional view taken along a line III-III in FIG. 1 and FIG. 4 is a cross-sectional view taken along a line IV-IV in FIG. 1.

This liquid crystal display apparatus is an active matrix liquid crystal display apparatus, and a liquid crystal layer 3 in which liquid crystal molecules are aligned in substantially parallel with surfaces of a pair of transparent substrates 1 and 2 facing each other with a gap therebetween with long axes being aligned in one direction is disposed between the substrates 1 and 2 as shown in FIGS. 1 to 4. On one of opposed inner surfaces of the pair of substrates 1 and 2, i.e., an inner surface of the one substrate, e.g., the substrate 2 on the opposite side of a display observation side (an upper side in FIGS. 2 and 3), there are provided follow members. A plurality of transparent pixel electrodes 4 which are arranged in a row direction (a lateral direction in FIG. 1) and a column direction (a vertical direction in FIG. 1). A plurality of thin film transistors (which will be referred to as TFTs hereinafter) 5 are respectively connected with these pixel electrodes 4. A plurality of scanning lines 12 are respectively formed along one side of each pixel electrode row and supply gate signals to the TFTs 5 in the respective rows. A plurality of signal lines 13 are respectively formed along one side of each pixel electrode column and supply data signals to the TFTs 5 in the respective columns. Finally, a transparent common electrode 15 is superimposed on the liquid crystal layer 3 side of the plurality of pixel electrodes 4 to cover the pixel electrodes 4 through an insulating film 14, at least one edge portion 15*d* being formed in accordance with a region corresponding to the pixel electrode 4. The common electrode 15 generates an electric field between the pixel electrode 4 and the edge portion 15*d*. The electric field controls an alignment direction of the liquid crystal molecules of the liquid crystal layer 3 in a place substantially parallel with the surfaces of the substrates 1 and 2.

Respective rim portions of the pair of substrates 1 and 2 are bonded through a non-illustrated frame-like sealing material. The liquid crystal layer 3 is formed by sealing a nematic liquid crystal having a positive dielectric anisotropy in a region surrounded by the sealing material between the substrates 1 and 2.

The TFT 5 is constituted as follows, gate electrode 6 is formed on an upper surface of the substrate 2, a transparent gate insulating film 7 is formed on a substantially entire upper surface of the substrate 2 to cover the gate electrode 6. An i-type doped semiconductor film 8 is formed on this gate insulating film 7 to face the gate electrode 6. A source electrode 10 and a drain electrode 11 are respectively provided on both side portions of the i-type semiconductor film 8 with a channel region therebetween through an n-type semiconductor film 9.

The plurality of scanning lines 12 are formed on the upper surface of the substrate 2 to be electrically connected with the gate electrodes 6 of the TFTs 5, and the plurality of signal lines 13 are formed on the gate insulating film 7 to be electrically connected with the drain electrodes of TFTs 5.

Each of the plurality of pixel electrodes 4 is formed into a substantially rectangular shape which corresponds to an entire predetermined pixel region on the gate insulating film 7 by using a transparent electroconductive film such as an ITO film. The source electrode 10 of the TFT 5 corresponding to each pixel electrode 4 is electrically connected with one corner portion of this pixel electrode 4.

The transparent interlayer insulating film 14 which covers the plurality of pixel electrodes 4, TFTs 5, scanning lines 12 and signal lines 13 is formed on the substantially entire inner surface side of the substrate 2. The common electrode 15 is formed on an insulating layer constituted of the gate insulating film 7 and the interlayer insulating film 14 to cover the pixel electrodes 4.

The common electrode 15 is formed of one transparent electroconductive film such as an ITO film. This common electrode is formed to correspond to not only the upper side of the pixel electrodes 4 but also both a region between the pixel electrodes 4 adjacent each other with the scanning line 12 therebetween and a region between the pixel electrodes 4 adjacent to each other with the signal line 13 therebetween. The common electrode 15 is constituted of a plurality of elongated partial electrodes (electrode sections) 15*a* extending in parallel with each other at intervals along the column direction at a part corresponding to each pixel electrode 4. These electrode sections 15*a* are separated from each other except both end portions in a lateral direction (the column direction), by each slit 16 formed between these sub-electrodes 15*a*. Each partial electrode 15*a* has the edge portions 15*d* extending along each slit 16 on the slit 16 side.

In this embodiment, the four slits 16 which are parallel to each other along the column direction are formed at a part corresponding to each of the plurality of pixel electrodes 4 of the transparent electroconductive film, and the three partial electrodes 15*a* are formed between these slits.

A width of each of the plurality of partial elongated electrodes 15*a* formed at the part of this common electrode 15 corresponding to each of the pixel electrodes 4 is set to be equal to a gap between the partial electrodes 15*a* adjacent to each other (a width of the slit 16).

Both side edge parts of a peripheral portion (an elongated portion extending in the column direction) 15*b* of the common electrode which is positioned in a region corresponding to a part of the common electrode 15 between the pixel electrodes 4 adjacent to each other with the signal line 13 therebetween are formed to have a width to face each of both peripheral portions of the pixel electrodes 4 adjacent to each other, as shown in FIG. 2.

Each of the slits 16 is formed to have a length substantially equal to a length of the pixel electrode 4 in the column direction (slightly longer as shown in FIG. 1 in this embodiment). As shown in FIG. 3, in regard to a width of the peripheral portion 15c of the common electrode (an elongated portion extending in the row direction) between end portions of the slits 16, which is positioned in a region of the common electrode 15 corresponding to a part between the pixel electrodes 4 with the operation line 12 therebetween, its both side edge parts are formed to have a width overlapping both peripheral portions of the pixel electrodes 4 adjacent to each other.

A terminal arrangement portion which laterally extends toward the outside of the substrate 1 is formed on the substrate 2 in an edge portion at one end in at least one of the row direction and the column direction. The plurality of scanning lines 12 and signal lines 13 are electrically connected with a plurality of scanning line terminals and signal line terminals arranged and formed on the terminal arrangement portion. The common electrode 15 is electrically connected with a common electrode terminal formed on the terminal arrangement portion through a lead wiring line led from one or more positions of an outer rim thereof.

A plurality of light shielding films 17 which prevent an erroneous operation due to light of the TFTs 5 are provided on the inner surface of the other substrate 1 to respectively face the plurality of TFTs 5. Further, color filters 18R, 18G and 18B having three colors, i.e., red, green and blue are provided to respectively correspond to each of pixels (regions where an alignment state of the liquid crystal molecules is controlled by an electric field generated between the pixel electrodes 4 and side edges of the respective partial electrodes 15a of the common electrode 15) formed of the plurality of pixel electrodes 4 and the common electrode 15.

Homogeneous alignment films 19 and 20 are respectively provided on the inner surface sides of the substrates 1 and 2 in a region surrounded by the frame-like sealing material to cover the color filters 18R, 18G and 18B and the common electrode 15.

These alignment films 19 and 20 are respectively subjected to an aligning treatment when oppositely rubbed along directions obliquely crossing each other at a predetermined angle in a range of 5° to 15° with respect to an elongated direction of each partial electrode 15a of the common electrode 15. The liquid crystal molecules in the liquid crystal layer 3, near the alignment films are aligned in substantially parallel with the surfaces of the substrates 1 and 2 with long axes being aligned in the aligning treatment direction of the corresponding alignment films 19 and 20.

Although not shown, this liquid crystal display apparatus includes a pair of polarizing plates respectively arranged on outer side of the pair of substrates 1 and 2. Of these polarizing plates, one polarizing plate is arranged in such a manner that its transmission axis becomes substantially parallel with the aligning treatment of the alignment films 19 and 20, and the other polarizing plate is arranged in such a manner that its transmission axis becomes substantially perpendicular or parallel with respect to the transmission axis of said one polarizing plate.

In this liquid crystal display apparatus, when a display signal is applied to each of the plurality of pixel electrodes 4 through each TFT 5, an electric field is generated between the edge portion of each partial electrode 15a of the common electrode 15 and the part of the pixel electrode 4 corresponding to the portion between the partial electrodes 15a, and an alignment direction of the liquid crystal molecules is controlled by this electric field in a plane substantially with the surfaces of the substrates 1 and 2, thereby effecting display.

In this liquid crystal display apparatus, the common electrode 15 is superimposed to cover the pixel electrodes 4 through the insulating film (the interlayer insulating film) 14 on the liquid crystal layer 3 side apart from the pixel electrodes 4, at least one edge portion 15d is formed in accordance with each region corresponding to each pixel electrode 4, and an electric field which controls an alignment direction of the liquid crystal molecules in a plane substantially parallel with the surfaces of the substrates 1 and 2 is generated between the pixel electrode 4 and the edge portion 15d. Therefore, an electric filed which is generated in the peripheral portion of the pixel electrode 4 excluding the part between the pixel electrode 4 and the common electrode 15 is blocked off with respect to the liquid crystal layer 3. As a result, light leak can be avoided without disorder of alignment of the pixel peripheral portion.

In this liquid crystal display apparatus, the plurality of slits 16 which form the edges 15d facing the pixel electrode 4 are formed in the common electrode 15 in accordance with each region corresponding to each of the plurality of pixel electrodes 4. Thus, an electric field having a substantially uniform intensity can be generated between each edge portion 15d of the common electrode 15 and the pixel electrode 4, thereby displaying a high-quality image.

Further, in the liquid crystal display apparatus, the plurality of scanning lines 12 which are formed along the respective pixel electrode rows and supply the gate signals to the TFTs 5 in the respective rows and the plurality of signal lines 13 which are formed along the respective pixel electrode columns and supply the data signals to the TFTs 5 in the respective columns are provided on the inner surface of the substrate 2. The common electrode 15 is formed into a shape extending in the pixel electrode row direction and the pixel electrode column direction on the insulating layer (a laminated film formed of the gate insulating film 7 covering the gate electrodes 6 of the TFTs 5 and scanning lines 12, and the interlayer insulating film 14 covering the pixel electrodes 4, the TFTs 5 and the signal lines 13) covering the plurality of pixel electrodes 4, TFTs 5, scanning lines 12 and signal lines 13 by the region covering both the region between the pixel electrodes 4 adjacent to each other with the scanning line 12 therebetween and the region between the pixel electrodes 4 adjacent to each other with the signal line 13 therebetween. The part of the common electrode 15 corresponding to the pixel electrode 4 is constituted of the plurality of partial electrodes 15a aligned in parallel with each other at intervals, and an electric field which controls an alignment direction of the liquid crystal molecules is generated between the edge portion 15d of each partial electrode 15a and the pixel electrode 4. Therefore, an electric field generated between the scanning and signal lines 12 and 13 and the edge portion of the pixel electrode 4 can be blocked off by the common electrode 15, and disorder of alignment of the liquid crystal molecules at the periphery of each pixel due to this electric field can be eliminated. Therefore, light leak between the pixels adjacent to each other can be eliminated, and an image having an excellent quality can be displayed.

That is, in this liquid crystal display apparatus, the common electrode 15 is constituted of the electroconductive film which is formed to correspond to both the region between the pixel electrodes 4 adjacent to each other with the scanning line 12 therebetween and the region between the pixel electrodes 4 adjacent to each other with the signal line 13 therebetween. The plurality of slits 16 forming the plurality of partial electrodes 15a aligned in parallel at intervals are provided at the parts of the electroconductive film corresponding to the plurality of pixel electrodes 4. Therefore, it is possible to block off both an electric field generated between the scanning line 12 and the edge portion of the pixel electrode 4 and an electric field generated between the signal line 13 and the edge portion of the pixel electrode 4 by the portions 15b and 15c of the common electrode 15 corresponding to the regions between the pixel electrodes 4 adjacent to each other.

Accordingly, an electric field generated between the scanning line 12 and the edge portion of the pixel electrode 4 and an electric field generated between the signal line 13 and the edge portion of the pixel electrode 4 do not affect the liquid crystal layer 3, and alignment of the liquid crystal molecules in the regions between the pixels adjacent to each other is not disordered. Therefore, light leak can be eliminated in the entire pixel peripheral portion.

Further, according to this liquid crystal display apparatus, the common electrode 15 is formed of the electroconductive film having the plurality of slits 16 forming the plurality of partial electrodes 15a provided at the parts corresponding to the plurality of pixel electrodes 4. Therefore, the plurality of partial electrodes 15a corresponding to the pixel electrode 4 and the portions 15b and 15c corresponding to the regions between the pixel electrodes 4 adjacent to each other in the common electrode 15 can have a substantially equal potential, and an electric filed having a substantially uniform intensity can be generated between the edge portion of each partial electrode 15a of the common electrode 15 and the part of the pixel electrode 4 corresponding to the part between the partial electrodes 15a, thereby uniformly controlling the alignment direction of the liquid crystal molecules in the entire region of the pixels.

Therefore, in this liquid crystal display apparatus, there is no light leak in both the part between the adjacent pixels with the scanning line 12 therebetween and the part between the adjacent pixels with the signal line 13 therebetween. Therefore, a black mask which blocks off leak light around each pixel does not have to be provided, and an aperture ratio can be increased, thereby displaying a bright image with high contrast. Furthermore, since the pixel electrodes 4 are arranged to be closer to the substrate side as compared with the common electrode 15, a through hole or the like does not have to be provided to achieve connection with the source electrode of each TFT 5. Therefore, a manufacturing process becomes simple, and a reduction in an aperture ratio due to the through hole does not occur. Moreover, since the common electrode 15 is formed in a state where it is electrically connected with the substantially entire surface of the substrate, a high-quality image can be displayed with a uniform light transmission factor of each pixel on the entire region of the pixels.

Additionally, according to this liquid crystal display apparatus, since the plurality of pixel electrodes 4 are formed into shapes corresponding to the predetermined entire pixel region, the pixel electrodes 4 can have potentials which are substantially equal on the whole, an electric field having a further uniform intensity can be generated between the edge portion of each partial electrode 15a of the common electrode 15 and the portion of the pixel electrode 4 corresponding to the part between the partial electrodes 15a, and the alignment direction of the liquid crystal molecules can be further uniformly controlled in the entire region of the pixels, thereby displaying an image with a higher quality.

Second Embodiment

Figure 5:
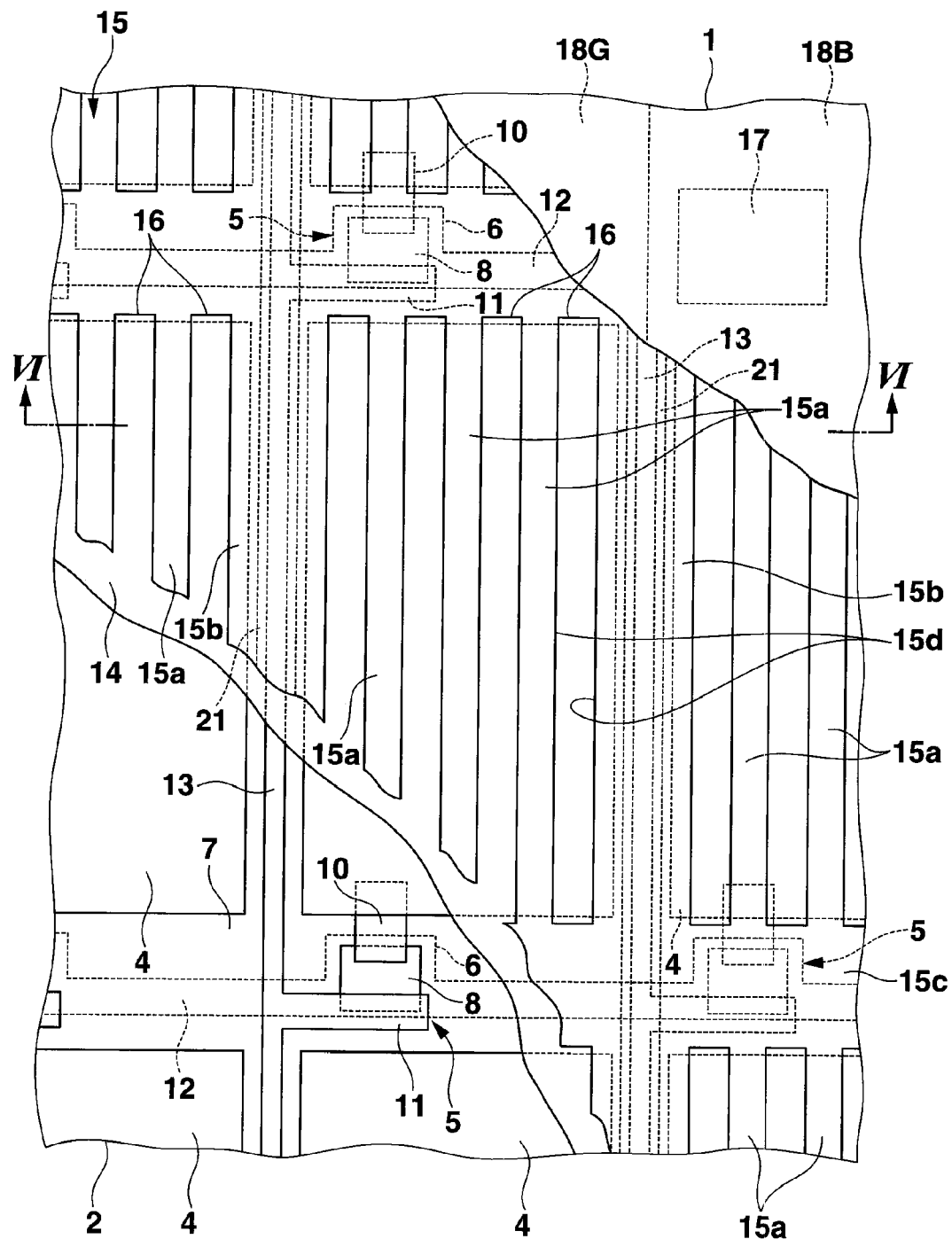
FIG. 5 is a plan view showing a part of a liquid crystal display apparatus according to a second embodiment of the present invention.
Figure 6:
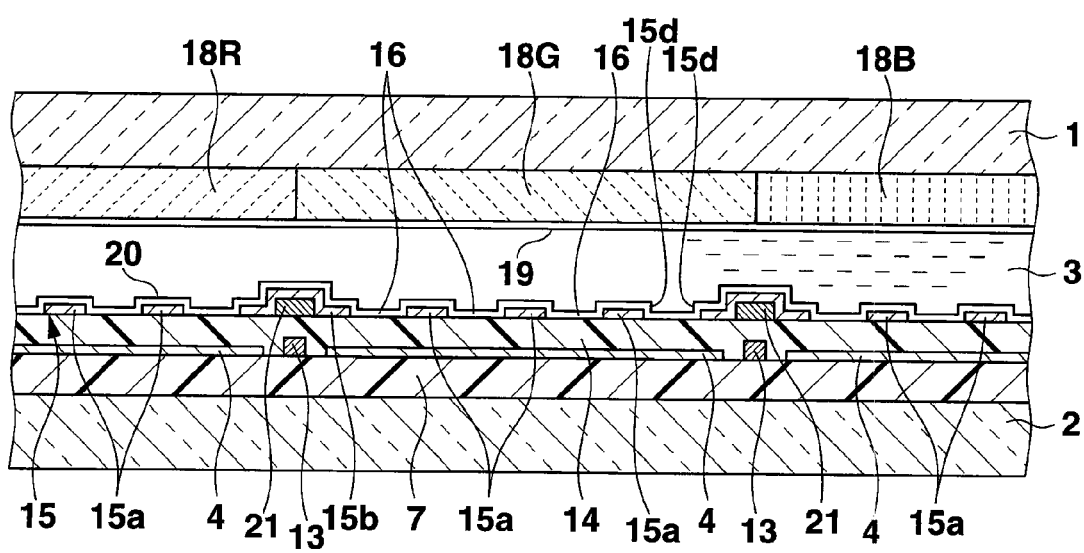
FIG. 6 is a cross-sectional view taken along a line VI-VI in FIG. 5.

FIGS. 5 and 6 show a second embodiment of the present invention, in which FIG. 5 is a plan view showing a part of a liquid crystal display apparatus and FIG. 6 is a cross-sectional view taken along a line VI-VI in FIG. 5.

In the liquid crystal display apparatus according to this embodiment, a common electrode line 21 constituted of a metal electroconductive film having a low resistance is provided at a portion of the common electrode 15 corresponding to a region between the pixel electrodes 4 along an entire length of this region, and other structures are the same as those in the first embodiment. Therefore, like reference numerals denote members equal to those in the first embodiment, thereby eliminating their explanation.

Each common electrode line 21 is formed on the interlayer insulating film 14 in parallel with the scanning or line at a position overlapping the scanning or line to correspond to one of a region between the adjacent pixel electrodes 4 with the scanning line 12 therebetween, and a region between the adjacent pixel electrodes 4 with the signal line 13 therebetween. In this embodiment, the common electrode lines is provided in the region between the adjacent pixel electrodes 4 with the signal line 13 therebetween. The common electrode lines 21 are connected in common on the outer side of an arrangement region of the pixel electrodes 4, and its common connecting portion is connected with a common electrode terminal formed at a terminal arrangement portion of the substrate 2.

Additionally, the common electrode 15 is formed on the interlayer insulating film 14 to overlap the common electrode lines 21.

In this liquid crystal display apparatus according to this embodiment, each common electrode line 21 formed of the metal electroconductive film having a low resistance is provided at the part of the common electrode 15 corresponding to the region between the pixel electrodes 4 along the entire length of this region. Therefore, a potential of the common electrode 15 of the plurality of pixels arranged in the row direction and column directions can be substantially homogenized, thereby displaying an image without luminance irregularities.

In this embodiment, each common electrode line 21 is provided at the part of the common electrode 15 corresponding to the region between the pixel electrodes 4 adjacent to each other with the signal line 13 therebetween. However, the common electrode line 21 may be provided at a part corresponding to the region between the pixel electrodes 4 adjacent to each other with the scanning line 12 therebetween. Further, the common electrode line 21 may be provided on the common electrode 15.

In the first and second embodiments, the common electrode 15 is formed to correspond to the plurality of pixel electrodes 4 and both the region between the pixel electrodes 4 adjacent to each other with the scanning line 12 therebetween and the region between the pixel electrodes 4 adjacent to each other with the signal line 13 therebetween. However, the common electrode 15 may be formed to correspond to the plurality of pixel electrodes 4 and one of the region between the adjacent pixel electrodes 4 with the scanning line 12 therebetween and the region between the adjacent pixel electrodes 4 with the signal line 13 therebetween.

In this case, an electric field generated between at least one of the scanning line 12 and the signal line 13 and the edge portion of the pixel electrode 4 can be blocked off by the common electrode 15 so that disorder of alignment of the liquid crystal molecules in the region between the adjacent pixels due to this electric field can be eliminated. Therefore, light leak between the pixels adjacent to each other can be eliminated, thereby displaying an image with an excellent quality.

When the common electrode 15 is formed to correspond to the plurality of pixel electrodes 4 and one of the region between the adjacent pixel electrodes 4 with the scanning line 12 therebetween and the region between the adjacent pixel electrodes 4 with the signal line 13 therebetween in this manner, it is good enough to form the common electrode 15 of the electroconductive film which is formed to correspond to the plurality of pixel electrodes 4 and the regions between the pixel electrodes 4 in accordance with each pixel row or each pixel column, the electroconductive film being constituted of a plurality of partial electrode segment to which a plurality of slits or comb-like elongated notch portions forming a plurality of partial electrodes 15a aligned in parallel at intervals are provided at parts corresponding to the plurality of pixel electrodes 4, and a connecting portion which connects end portions of these partial electrodes in common.

Third Embodiment

Figure 7:
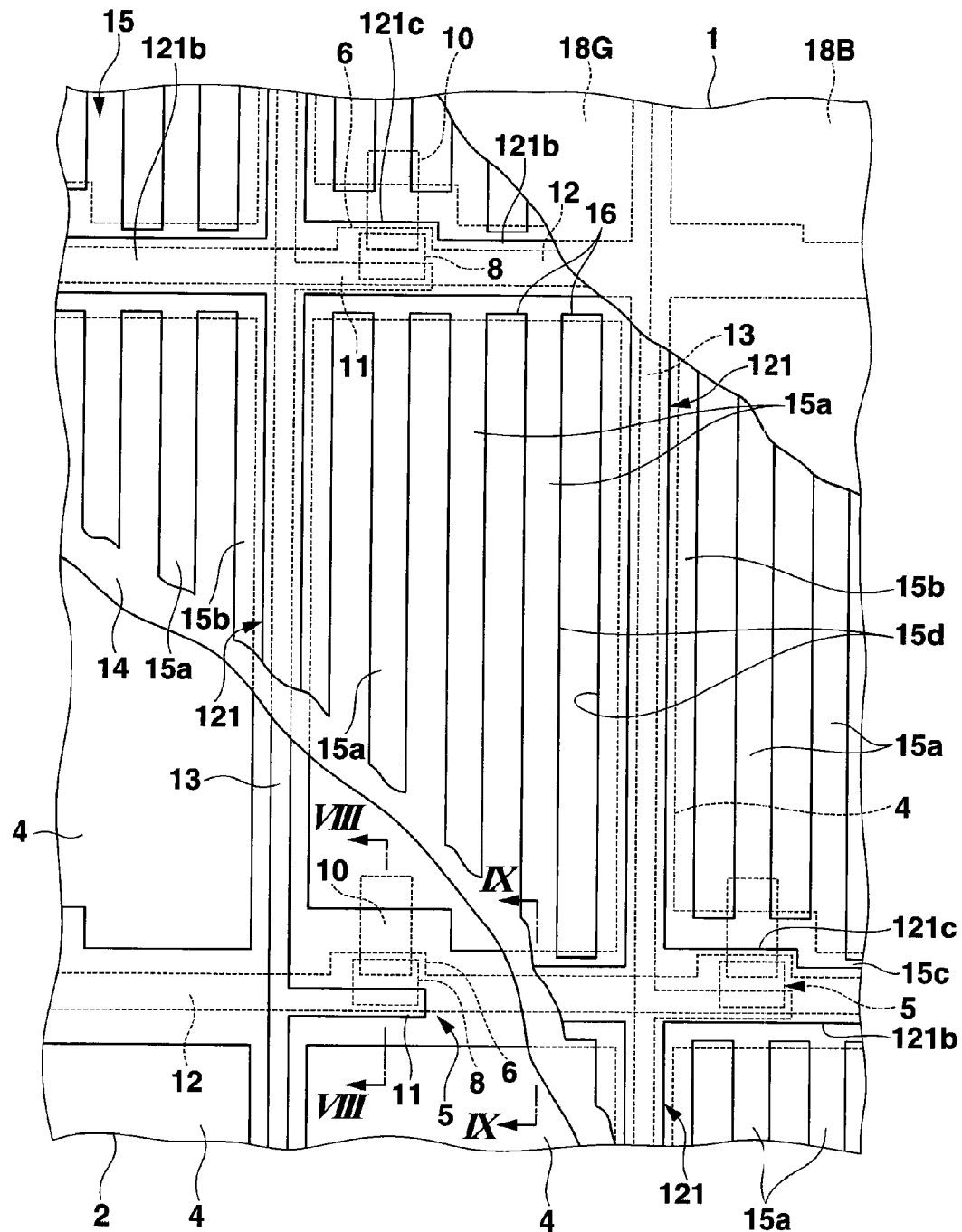
FIG. 7 is a plan view showing a part of a liquid crystal display apparatus according to a third embodiment of the present invention.
Figure 8:
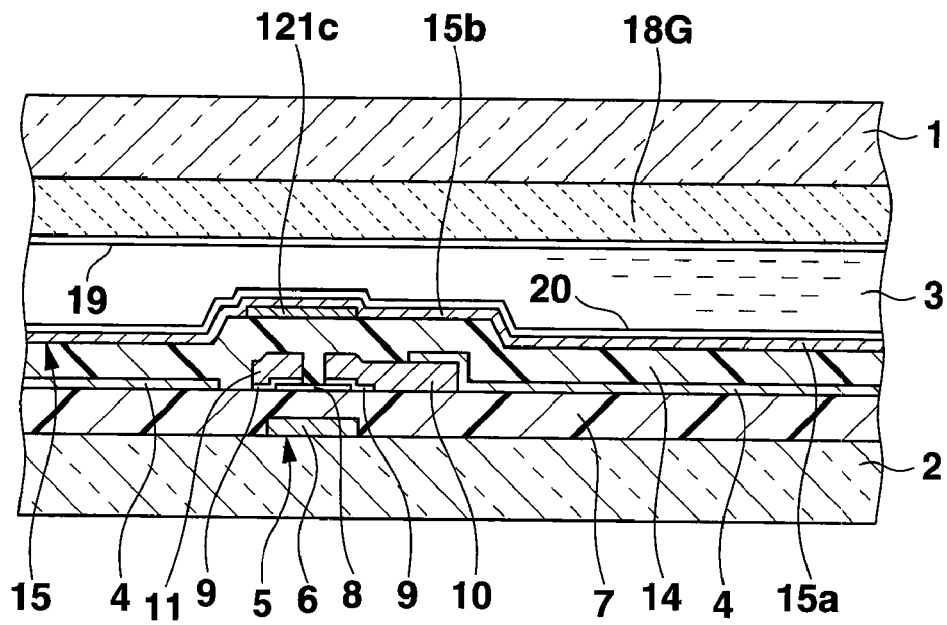
FIG. 8 is a cross-sectional view taken along a line VIII-VIII in FIG. 7.
Figure 9:
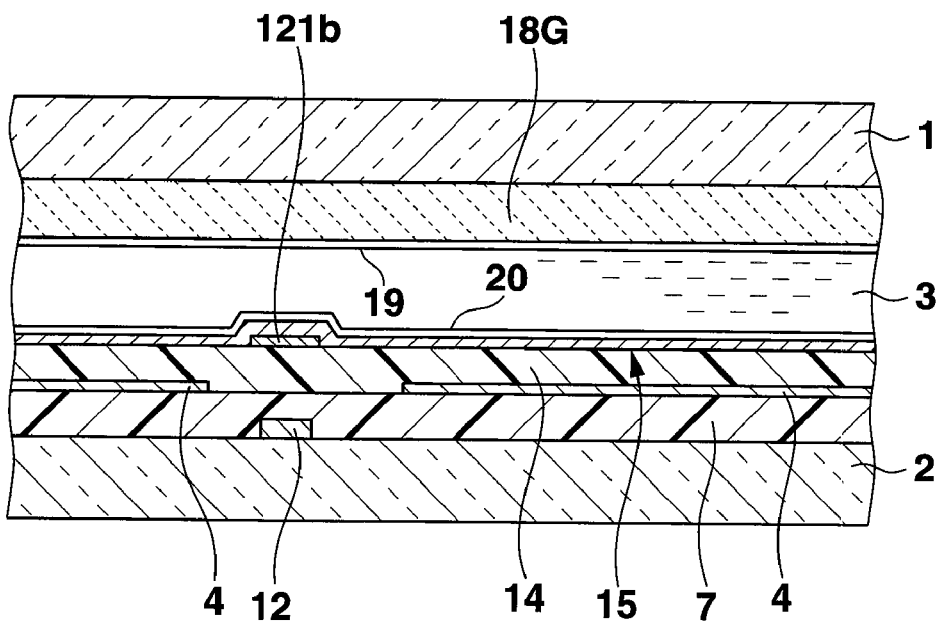
FIG. 9 is a cross-sectional view taken along a line IX-IX in FIG. 7.

FIGS. 7, 8 and 9 show a third embodiment of the present invention, in which FIG. 7 is a plan view showing a part of a liquid crystal display apparatus, FIG. 8 is a cross-sectional view taken along a line VIII-VIII in FIG. 7 and FIG. 9 is a cross-sectional view taken along a line IX-IX in FIG. 7.

In the liquid crystal display apparatus according to this embodiment, common electrode lines formed of a metal electroconductive film having a low resistance are formed in a reticular or grid pattern to correspond to both regions each positioned between adjacent pixel electrodes 4 with the signal line 13 therebetween and regions each provided between the adjacent pixel electrodes 4 with the scanning line 12 therebetween in addition to partial electrodes 15a. Other structures are the same as those in the second embodiment. Therefore, like reference numerals denote members equal to those in the second embodiment, thereby eliminating their explanation.

In this liquid crystal display apparatus, the common electrode line 121 constituted of the metal electroconductive film having a low resistance is formed on the interlayer insulating film 14. The common electrode line 121 as a grid-like shape includes a column wiring line portion 121a extending in parallel with the signal line 13 at a position overlapping the signal line 13 a row wiring line portion 121b electrically connected to the column wiring line portion 121a. The lather portion 121b extends in parallel with the scanning line 12 at a position overlapping the scanning line 12 between the adjacent pixel electrodes 4 with the scanning line 12 therebetween. That is, the grids common electrode line 121 is formed to surround all four outer sides of the pixel electrodes 4 by the column wiring line portions 121a and the column wiring line portions 121b. Furthermore, a part of the row wiring line portion 121b corresponding to the TFT 5 is widely formed with respect to the other portion of row wiring line portion 121b, thereby forming a light shielding portion 121c which covers the upper side of the TFT 5.

The common electrode 15 is formed to be superimposed on the interlayer insulating film 14 and the common electrode line or grid film 121.

Also, in this liquid crystal display apparatus, the common electrode 15 is constituted of a transparent electroconductive film in which a plurality of edge portions 15d aligned in parallel with each other at intervals in a region corresponding to each pixel are formed, and a metal electroconductive film formed along both the scanning line 12 extending in the row direction between the adjacent pixels and the signal line 13 extending in the column direction on the insulating film 14 of the substrate 2.

According to the liquid crystal display apparatus of this embodiment, the parts of the common electrode line 121 extending along the scanning line 12 and the signal line 13 are provided at the portion of the common electrode 15 corresponding to the regions between the pixel electrodes 4 adjacent to each other. Therefore, a potential of the common electrode 15 of the plurality of pixels arranged in the row and column directions can be substantially homogenized, thereby displaying an image without luminance irregularities. Moreover, since the light shielding portion 121c is formed in the row wiring line portion 121b formed along the scanning line 13, the semiconductor layer of the TFT 5 can be shield against light. Therefore, a light shielding film does not have to formed on the substrate on the opposed observation side, thus increasing a numerical apertures.

Fourth Embodiment

Figure 10:
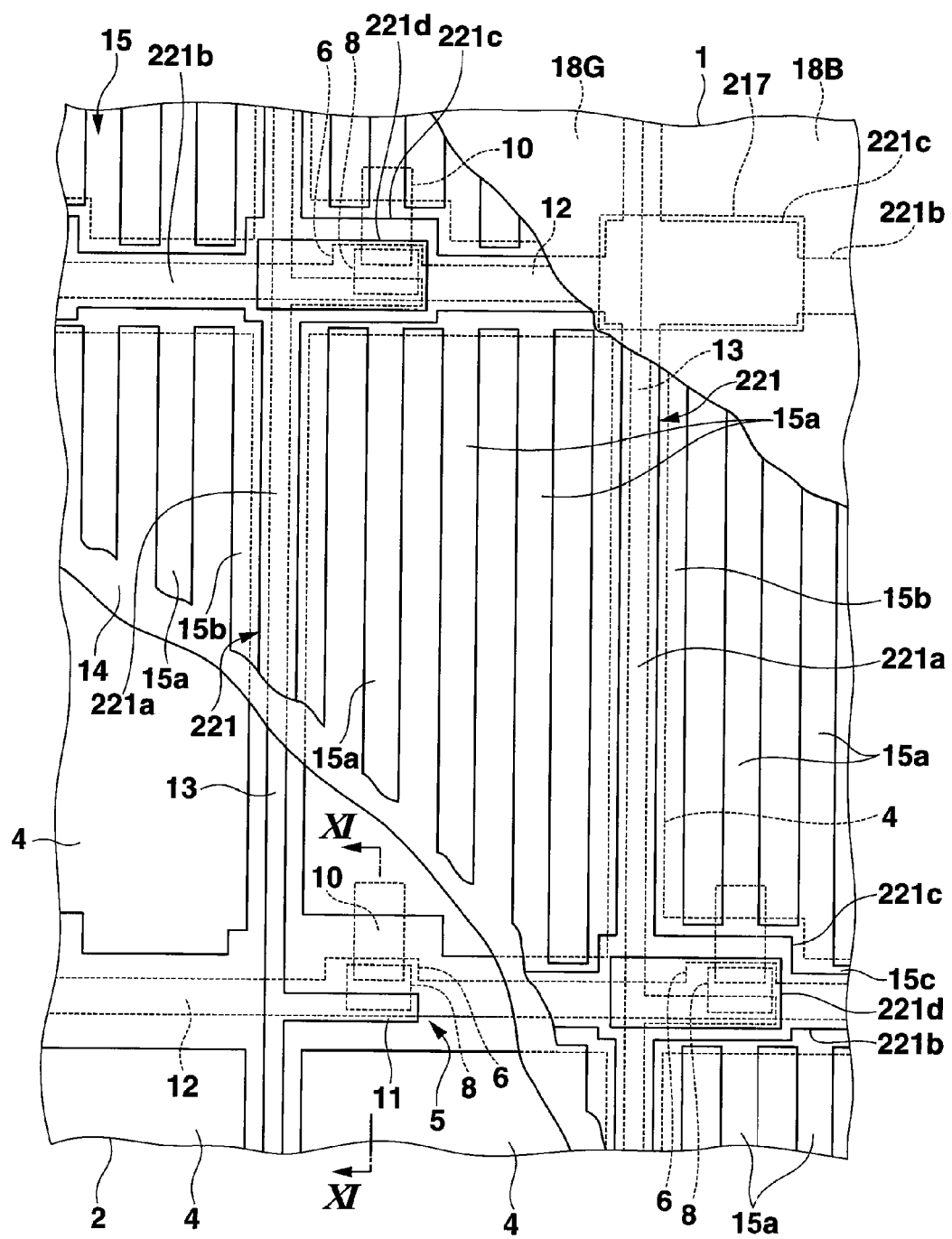
FIG. 10 is a plan view showing a part of a liquid crystal display apparatus according to a fourth embodiment of the present invention.
Figure 11:
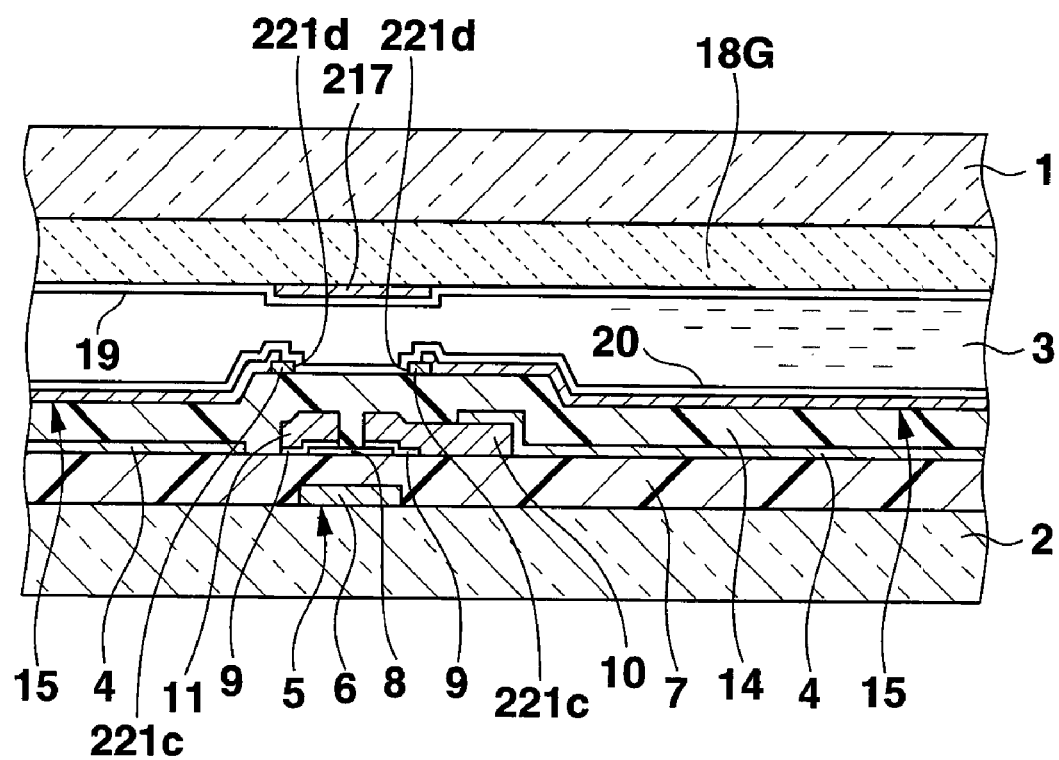
FIG. 11 is a cross-sectional view taken along a line XI-XI in FIG. 10.

FIGS. 10 and 11 show a fourth embodiment of the present invention, in which FIG. 10 is a plan view showing a part of a liquid crystal display apparatus, and FIG. 11 is a cross-sectional view taken along a line XI-XI in FIG. 10.

In the liquid crystal display apparatus according to this embodiment, a common electrode line or layer formed of a metal electroconductive film having a low resistance is formed in a reticular grid pattern to correspond to both regions between the adjacent pixel electrodes 4 with the signal lines 13 therebetween and regions between the adjacent pixel electrodes 4 with the scanning lines 12 therebetween except regions corresponding to TFTs 5, and a light shielding film is formed in regions of the opposed substrate 1 facing the TFTs 5. Other structures are the same as those in the third embodiment. Therefore, like reference numerals denote members equal to those in the third embodiment, thereby eliminating their explanation.

In this liquid crystal display apparatus, a common electrode lines 221 formed of the metal electroconductive film having a low resistance is formed into a shape in which a column wiring line portion 221a extending in parallel with the signal line 13 at a position overlapping the signal line 13 is connected with a row wiring line portion 221b extending in parallel with the scanning line 12 at a position overlapping the scanning line 12 to correspond both the region between the adjacent pixel electrodes 4 with the scanning line 12 therebetween and the region between the adjacent pixel electrodes 4 with the signal line 13 therebetween on the interlayer insulating film 14. That is, this common electrode layer 221 is formed into a reticular pattern which surrounds all four outer sides of the pixel electrodes 4 by the column wiring line portions 221a and the row wiring line portions 221b. A wide portion 221c is formed in the row wiring line portion 221b of the common electrode line 221 formed in parallel with the scanning lien 12 in a region corresponding to the TFT 5, and an opening 221d is formed in a part of this wide portion 221c corresponding to the TFT 5.

A transparent electroconductive film of the common electrode 15 is formed to be superimposed on the interlayer insulating film 14 and the common electrode line 22 except the openings 221d of the row wiring line portion 221b. Therefore, the common electrode 15 formed of the transparent electroconductive film and the metal electroconductive film is formed in a region excluding the upper side of each TFT 5.

A light shielding film 217 is provided in a region corresponding to each TFT 5, on an inner surface of the second substrate 1 as an observation side facing the first substrate 2.

As described above, in this liquid crystal display apparatus, the common electrode 15 formed of the transparent electroconductive film and the metal electroconduction film, the transparent film being formed to correspond pixel electrodes 4 on the liquid crystal layer 3 side apart from each pixel electrodes 4 through the insulating film 14 and in which a plurality of edge portions aligned in parallel with each other at intervals in regions corresponding to pixels, and the metal film being formed along both the scanning lines 12 extending in the row direction between the pixels adjacent to each other and the signal lines 13 extending in the column direction in regions corresponding to the TFTs 5 to cover these scanning lines 12 and signal lines 13. Furthermore, the light shielding film 217 is arranged in the region corresponding to each TFT 5.

According to the liquid crystal display apparatus of this embodiment, the common electrode line 221 formed of the metal electroconductive film having a low resistance is provided at portions of the common electrode 15 corresponding to the regions between the pixel electrodes 4 adjacent to each other along the scanning lines 12 and the signal lines 13. Therefore, a potential of the common electrode 15 of the plurality of pixels arranged in the row direction and the column direction can be substantially homogenized, thereby displaying an image without luminance irregularities. Moreover, since the common electrode 15 formed of the transparent electroconductive film and the metal electroconductive film is formed in the regions excluding the upper sides of TFTs 5, a stray capacity formed between the common electrode 15 and the TFTs 5 can be reduced, and a load applied to a driver of the liquid crystal display apparatus can be decreased. Additionally, just forming the light shielding film 217 which shields each TFT 5 alone against light on the second substrate 1 can suffice, thus increasing a aperture ratio of each pixel.

Fifth Embodiment

The description has been given as to the example in which each slit is formed in parallel with the signal line 13 and each partial electrode 15a is provided in parallel with the signal line 13 in the common electrode 15 in conjunction with the first to fourth embodiments. However, the liquid crystal display apparatus according to the present invention is not restricted thereto, and each slit may be obliquely formed with respect to the signal line 13 as shown in FIG. 12.

Figure 12:
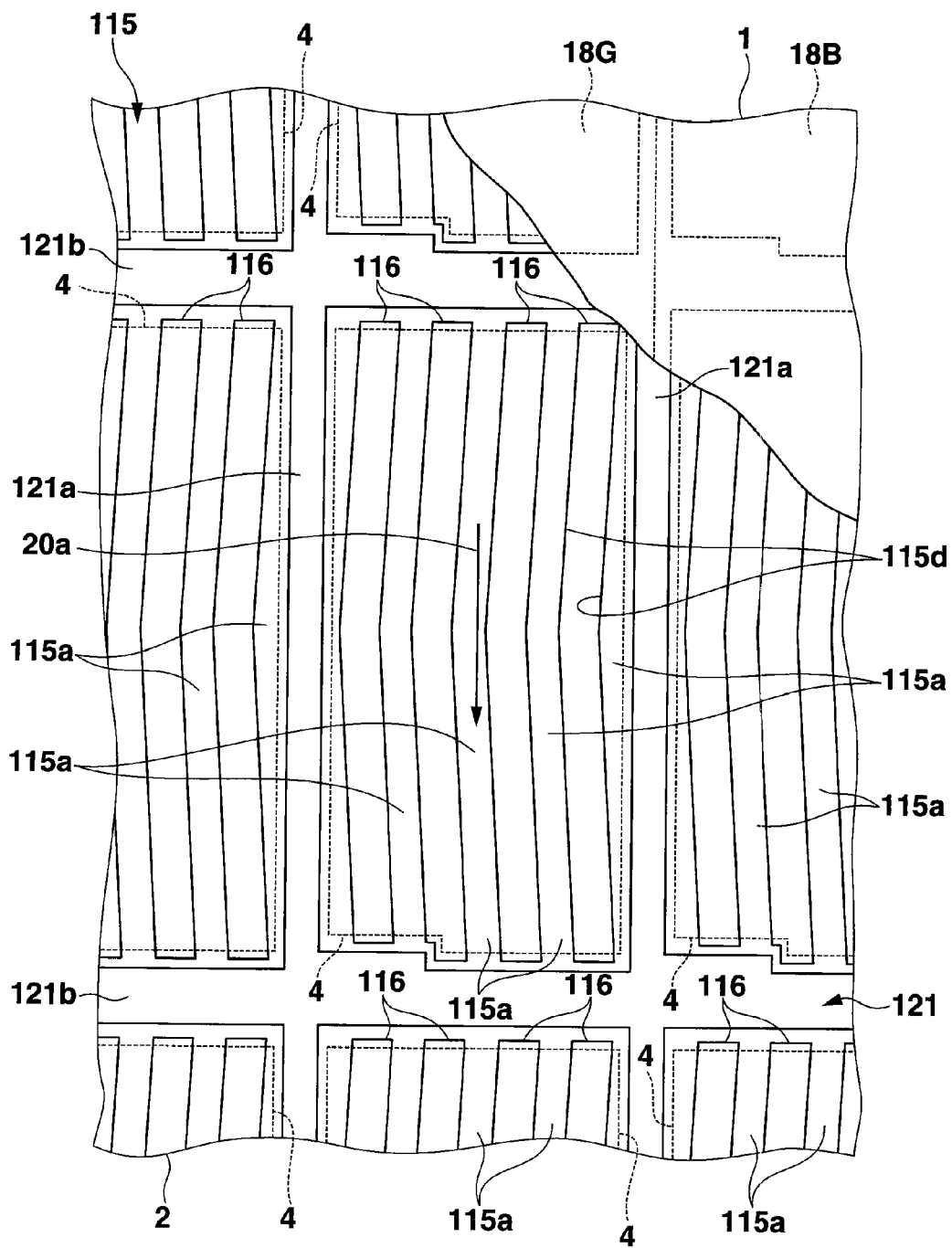
FIG. 12 is a plan view showing a part of a liquid crystal display apparatus according to a fifth embodiment of the present invention.

FIG. 12 shows a liquid crystal display apparatus according to the fifth embodiment of the present invention, and it is a plan view showing a planar shape of a common electrode formed on a first substrate when a structure of the common electrode according to this embodiment is applied to the third embodiment. This fifth embodiment is different from the third embodiment in a shape of the common electrode alone, and other structures are the same. Therefore, like reference numerals denote like members, thereby eliminating their explanation.

As shown in FIG. 12, each slit 116 formed in a common electrode 115 is formed in a direction obliquely crossing an aligning treatment direction 20a of an alignment film 20 to form each edge portion 115d which crosses in an oblique state except perpendicular and parallel states a direction of long axes of liquid crystal molecules aligned by the alignment film 20 formed on an inner surface of the substrate 2. That is, in the common electrode 115 according to this embodiment, the slits 116 forming the plurality of edge portions 115d aligned in parallel with each other at intervals are provided, and these slits are bent in a V-like shape to form the edge portions which cross in an oblique state except perpendicular and parallel states the aligning treatment direction 20a indicated by an arrow of the alignment film 20 formed on the inner surface of the substrate 2.

According to this configuration, when a voltage is applied between each pixel electrode 4 and the common electrode 115 with respect to liquid crystal molecules initially aligned between the pair of substrates, an electric field in an oblique direction is applied to the liquid crystal molecules. Therefore, behaviors of the liquid crystal molecules can be uniformed, thereby avoiding disorder of alignment of the liquid crystal molecules in each pixel.

It is to be noted that the shape of this common electrode can be applied each of the first to fourth embodiments.

Sixth Embodiment

Although each of the plurality of pixel electrodes 4 is formed into a substantially rectangular shape corresponding to a predetermined entire pixel region, in the first to fifth embodiments, the pixel electrode 4 may be formed into a comb-like shape corresponding to regions between the plurality of partial electrodes 15a of the common electrode 15.

Figure 13:
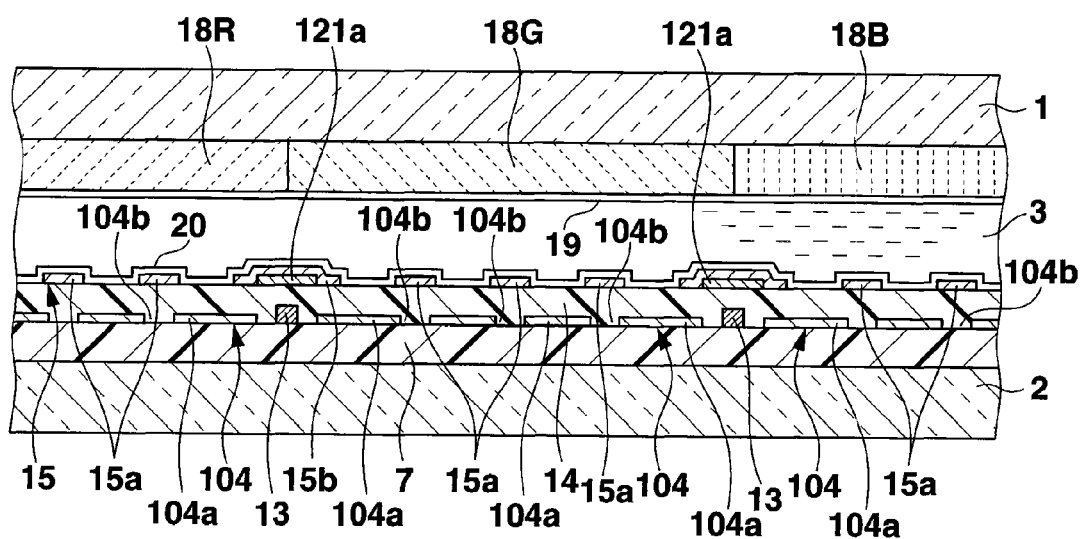
FIG. 13 is a cross-sectional view showing a part of a liquid crystal display apparatus according to a sixth embodiment of the present invention.

The pixel electrode is formed into a comb-like shape in the sixth embodiment, and FIG. 13 shows an example in which this pixel electrode configuration is applied to the liquid crystal display apparatus according to the third embodiment. The sixth embodiment is different from the third embodiment in a shape of the pixel electrode alone, and other structures are the same. Therefore, like reference numerals denote like members, thereby eliminating their explanation.

As shown in FIG. 13, in the pixel electrode configuration according to this embodiment, a plurality of opening portions 104b are formed in each pixel electrode 104 to form a plurality of pixel partial electrodes 104a. This opening portion 104b has a shape corresponding to a slit 16 formed in the common electrode 15 in a region corresponding to this pixel electrode 104, and it is formed in a region overlapping the slit 16 of the common electrode 15.

Further, it is desirable to form both side edges of a part of this pixel electrode 104 corresponding to a region between the partial electrodes 104a to have widths respectively facing edge portions of the partial electrodes 15a adjacent to each other in the common electrode 15.

Such a shape of the common electrode also, can be applied to each of the first to fifth embodiments.

According to this pixel electrode 104, since a total area overlapping the common electrode 15 is reduced, a stray capacity generated between the pixel electrode 104 and the common electrode 15 can be reduced, thereby decreasing a load applied to a driver of the liquid crystal display apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display device comprising:
   a first substrate;
   a second substrate which is arranged to face the first substrate;
   a liquid crystal layer which is provided between the first substrate and the second substrate;
   a thin film transistor which is formed on a surface side of the second substrate facing the first substrate;

a pixel electrode which is formed on the surface side of the second substrate facing the first substrate, and which is connected to the thin film transistor;

a scanning line which supplies a gate signal to the thin film transistor;

a signal line which supplies a data signal to the thin film transistor;

an insulating film which covers the thin film transistor, the pixel electrode, the scanning line, and the signal line; and a common electrode which is arranged on the insulating film, wherein the pixel electrode has a pair of first short side edges extending in a first direction, and a pair of first long side edges extending a second direction perpendicular to the first direction, and wherein the common electrode has a plurality of first slits in a portion overlapping with the pixel electrode, the first slits having a pair of second short side edges which extend in the first direction and which are shorter than the pair of the first short side edges, and a pair of second long side edges which extend in the second direction and which are longer than the pair of the first long side edges such that the pair of the second short side edges are arranged so as to be not overlapped with the pixel electrode.

2. The liquid crystal display device according to claim 1, wherein said pair of the second long side edges extend in a direction perpendicular to a direction in which the scanning line extends.

3. The liquid crystal display device according to claim 1, wherein said pair of the second long side edges extend in a direction in which the signal line extends.

4. The liquid crystal display device according to claim 1, further comprising an alignment film which is formed on the common electrode and which initially aligns liquid crystal molecules in the liquid crystal layer in an oblique direction with respect to the second long side edges.

5. The liquid crystal display device according to claim 1, wherein the common electrode includes:

a transparent electroconductive film which is formed on the insulating film, and which has said first slits, and a metal electroconductive film which is provided between the transparent electroconductive film and the insulating film, and which covers the scanning line and the signal line.

6. The liquid crystal display device according to claim 1, wherein the liquid crystal layer includes liquid crystal molecules which have a positive dielectric anisotropy, and which are aligned so that long axes of the liquid crystal molecules are substantially parallel with surfaces of the first and second substrates.

7. The liquid crystal display device according to claim 5, wherein the metal electroconductive film defines a plurality of second slits in each of which the first slits of the transparent electroconductive film and the pixel electrode are overlapped.

* * * * *